United States Patent [19]
Evans et al.

[11] Patent Number: 5,462,823
[45] Date of Patent: * Oct. 31, 1995

[54] MAGNETIC RECORDING MATERIALS PROVIDED WITH A PHOTOSENSITIVE LAYER

[75] Inventors: Christopher M. Evans; Mark R. Buckingham, both of Essex; Colin F. Norman, Hertfordshire, all of England

[73] Assignee: Minnesota Mining and Manufacturing Company, St. Paul, Minn.

[*] Notice: The portion of the term of this patent subsequent to Feb. 14, 2012, has been disclaimed.

[21] Appl. No.: 152,811

[22] Filed: Nov. 15, 1993

[30] Foreign Application Priority Data

Nov. 16, 1992 [GB] United Kingdom ............... 9224003

[51] Int. Cl.$^6$ ................... G11B 13/04
[52] U.S. Cl. .............. 430/14; 430/10; 430/17; 430/332; 430/336; 430/338; 430/340; 430/334; 430/339; 360/77.03; 360/131; 360/135
[58] Field of Search ............... 430/332, 336, 430/338, 340, 334, 339, 10, 14, 17; 360/77.03, 131, 135

[56] References Cited

U.S. PATENT DOCUMENTS

| | | | |
|---|---|---|---|
| 3,980,480 | 9/1976 | Laridon et al. | 430/336 |
| 4,008,085 | 2/1977 | Lemahieu et al. | 430/338 |
| 4,123,788 | 10/1978 | Kruger | 360/77 |
| 4,315,283 | 2/1982 | Kinjo et al. | 358/128.6 |
| 4,371,904 | 2/1983 | Brooke | 360/77 |
| 4,558,383 | 12/1985 | Johnson | 360/77 |
| 4,633,451 | 12/1986 | Ahn et al. | 360/135 |
| 4,737,877 | 4/1988 | Krongelb et al. | 360/135 |
| 4,816,939 | 3/1989 | Ford et al. | 360/77.03 |
| 4,843,494 | 6/1989 | Cronin et al. | 360/77.03 |
| 4,876,886 | 10/1989 | Bible et al. | 73/151.5 |
| 5,196,297 | 3/1993 | Dombrowski, Jr. et al. | 430/338 |

FOREIGN PATENT DOCUMENTS

| | | |
|---|---|---|
| 0351837 | 7/1989 | European Pat. Off. . |
| 423662 | 10/1990 | European Pat. Off. . |
| 2315142 | 6/1975 | France . |
| 3-201215 | 12/1989 | Japan . |
| 3-219432 | 9/1991 | Japan . |
| 4-059399 | 2/1992 | Japan . |
| 4-305844 | 10/1992 | Japan . |
| WO85/02933 | 7/1985 | WIPO . |
| WO88/02168 | 3/1988 | WIPO . |

OTHER PUBLICATIONS

IBM Technical Disclosure Bulletin, vol. 21, No. 10, Mar. 1979, "Floppy Disc Emobssing For Servo Applications", R. E. Acosta et al.

IBM Technical Disclosure Bulletin, vol. 23, No. 7B, Dec. 1980, "Optical Storage of Data on a Magnetic Medium", F. P. Laming et al.

IBM Technical Disclosure Bulletin, vol. 20, No. 10, Mar. 1978, "Optical Servo Magnetic Recording", A. S. Hoagland.

IEEE Transactions on Magnetics, vol. MAG–16, No. 5, Sep. 1980, "Optical Method of the Head Positioning in Magnetic Disk Systems", N. Koshino and S. Ogawa.

D. A. Thompson et al., in "Embossed Servo Techniques for Floppy Disks": IERE Conference Proceedings, No. 43, p. 321, Jul. 1978.

Primary Examiner—Charles L. Bowers, Jr.
Assistant Examiner—John A. McPherson
Attorney, Agent, or Firm—Gary L. Griswold; Walter N. Kirn; Susan Moeller Zerull

[57] ABSTRACT

Disclosed is a magnetic recording element comprising a support having coated on at least one major surface thereof a layer of a magnetic recording medium and a photosensitive layer which may be separate from or integral with the magnetic recording layer and which contains an infrared absorbing dye or its precursors. Information can be imparted to the photosensitive layer by imagewise exposure to actinic radiation which will either promote or inhibit generation or destruction of the infrared absorbing dye.

24 Claims, 1 Drawing Sheet

MAGNETIC RECORDING MATERIALS PROVIDED WITH A PHOTOSENSITIVE LAYER

The present invention relates to a method of recording information, such as optical servo tracking information, on magnetic recording materials.

BACKGROUND OF INVENTION

Magnetic recording is the preferred method of information storage when data must be capable of being read immediately after writing or where the data is to be processed by a machine.

Since 1950, rapid improvements in the field of magnetic recording have been achieved and, as the continuing advances in information handling technology have led to the requirement for data storage and retrieval systems capable of handling extremely large volumes of information, one of, the main areas of the research into magnetic recording systems has been to increase the information density or storage capacity of the media.

Magnetic data storage or recording apparatus typically use magnetic recording media in which data is stored in "tracks". In rigid type magnetic disk drives, track densities of between 20 and 40 tracks per mm (500 and 1000 tracks per inch) are typically used. The track density of magnetic storage disks for conventional floppy disk drives is typically from 2 to 5 tracks per mm (48 to 135 tracks per inch).

Most of the currently available systems of magnetic recording employ particulate magnetic recording media in which small, discrete magnetic particles (referred to as the "magnetic pigment or paint") are dispersed in an organic binder matrix. The degree of storage that is possible is related to the packing density of the magnetic particles in the media, and the amount of information that can be recorded on such materials is fast approaching its theoretical limit.

The problem with magnetic disks carrying a large amount of information in densely packed magnetic tracks is that it is difficult to ensure proper positioning of the read/write (or transducer) head to a desired track and to ensure accurate tracking once the selected track has been found. As track density increases, a narrower read/write head is required for reading/writing the data in the tracks, and evermore precise tracking to allow the correct track to be located with the read/write head positioned accordingly. Moreover, it is important not only that the tracking technique be reliable but it is also highly desirable that it be easy and inexpensive to implement. It should also be able to handle the inevitable slight variations that are usual in magnetic recording media.

The need for accurate head tracking has long been appreciated and various approaches to this end, including servo controlled head positioning systems, have been proposed with varying degrees of success.

Optical disk drives are capable of achieving track densities in excess of 590 tracks per mm (15,000 tracks per inch). These higher track densities are achieved through the use of closed loop optical servos that allow the read/write head to follow data track eccentricities caused by defects in the medium and by disturbances from outside forces.

Various techniques have been proposed for the modification of magnetic recording materials to provide optical servo information. These techniques can be divided into three broad categories:

The first category encompasses methods of recording optical information that involve physically deforming the magnetic medium, e.g., by stamping, embossing, laser ablation, hole punching, etc. These techniques are disclosed in European Patent Publication Nos. 336491, 351837 and 423662; French Patent Publication No. 2,315,142; U.S. Pat. Nos. 4,371,904, 4,123,788, and 4,315,283; R. E. Acosta et al., in "Floppy Disc Embossing for Servo Applications": IBM Technical Disclosure Bulletin, Vol. 21, No. 10, pp.4259 to 4260 (March 1978); A. S. Hoagland in "Optical Servo of Magnetic Recording": IBM Technical Disclosure Bulletin, Vol. 21, No. 10, pp. 4108 to 4109.(March 1978); International Patent Publication No. WO88/2168; and D.A. Thompson et al., in "Embossed Servo Techniques for Floppy Disks": IERE Conference Proceedings, No. 43, p.321 (July 1978).

The second category encompasses magnetic recording elements in which the optical information takes the form of reflective spots or tracks, either above or below the magnetic recording medium. In most cases, the reflective spots are formed by vacuum deposition of a metal, such as aluminum, e.g., as disclosed in U.S. Pat. Nos. 4,737,877 and 4,558,383, International Patent Publication No. WO88/02168, and French Patent Publication No. 2,315,142.

U.S. Pat. No. 4,633,451 discloses the use of a laser diode to optically servo track a plurality of reflective spots formed on the upper surface of a magnetic recording element. The element comprises a magnetic layer overcoated with a multilayer film, e.g., of amorphous silicon on rhodium.

The third category describes magnetic recording elements in which the servo tracking information is provided by absorptive tracks or spots situated, in most cases, between the magnetic recording medium and the support. Some methods of achieving this are specific to rigid aluminum supports, e.g., as disclosed in International Patent Publication No. WO85/02933 and N. Koshino and S. Ogawa in "Optical Method of Head positioning in Magnetic Disk Systems": IEEE Transactions on Magnetics, pp.631 to 633 (September 1980).

F. P. Laming and H. Mueller in "Optical Storage of Data on a Magnetic Medium": IBM Technical Disclosure Bulletin, Vol. 23, No. 7B, p.3319 (December 1980) disclose the use of optical servo tracks in the form of an absorptive pattern on the upper surface of the magnetic recording layer. The magnetic pigment itself undergoes a color change. It is not clear whether this affects the magnetic properties.

U.S. Pat. No. 4,816,939 discloses magnetic recording materials comprising a transparent support coated on one or both sides with a layer of magnetic recording medium, one side of the support being provided with an optical grating for servo tracking purposes. Different methods of forming the grating are suggested, including photolithographic techniques and photothermal techniques using photothermal materials, silver halide materials, silver transfer materials, photoresist materials etc., as well as techniques such as etching and vapor-deposition. However, in the only embodiment described in any detail, the grating is formed by a silver diffusion process or by photographic exposure and development of a high contrast silver halide film, both of which require wet processing.

Japanese Patent Publication No. 3-201215 discloses magnetic recording elements comprising an optical recording layer interposed between the support and magnetic recording layer. Although reference is made to the optical recording layer containing a dye, this is in the context of ablation-type materials where a laser or similar high intensity exposure source is used to burn away holes or pits in the optical recording layer, the integrity of the layer being destroyed rather than the dye itself.

Although various methods of incorporating optically-readable tracking data have been demonstrated, as exemplified above, the majority of the published literature is concerned primarily with the hardware, such as disk drives, scanning heads etc., rather than the actual magnetic recording materials and the very real problem of producing the relevant materials on a factory scale has not been addressed.

Ideally, any such magnetic recording elements should be compatible with existing disk drives and should be capable of being produced with the minimum of alteration to existing procedures for coating magnetic recording media. Floppy disks are normally cut from a continuous web of coated material and if this already contains the tracking images for the individual disks, the cutting must be performed with a very high degree of precision. Accordingly, the ability to image the magnetic recording elements after (or simultaneously with) the cutting process would be an advantage.

In the light of these requirements, the first category of magnetic recording materials are unsatisfactory, because the stamping or other deformation of the magnetic recording medium may render it unusable with conventional drives, and also sacrifices one of the main advantages of optical tracking, namely the fact that all the magnetic media is potentially available for data storage.

Although the second category of magnetic recording materials do not suffer from these problems, they require vapor-deposition techniques which are costly and difficult to integrate with solvent coating of the magnetic recording media.

The third category of magnetic recording materials is either vague about the method of producing the tracks, e.g., U.S. Pat. No. 4,843,494 discloses magnetic recording elements in which, the optical pattern is "photographically or otherwise formed", but gives no further details, or discloses wet-processed photographic methods that require the imaging to be carried out before coating the magnetic media.

The present invention seeks to provide an alternative method of recording information, such as optical servo tracking information, on magnetic recording materials.

BRIEF DESCRIPTION OF DRAWINGS

Referring to FIGS. 1a to 1d, a magnetic recording element, e.g., a magnetic recording disk, comprising a nonmagnetic support (1) having coated on two opposing sides thereof a layer of a magnetic recording medium (3 and 5 respectively), which may be a thin, continuous magnetic film or a particulate-based medium, is overcoated with a photosensitive layer (7) (FIG. 1b). The photosensitive layer (7), in this embodiment comprising the precursor(s) to a radiation-absorbing dye, is overlaid with a suitable mask (9) bearing image information (FIG 1c). Exposure of the photosensitive layer (7) through the mask (9) may initiate or, as in the embodiment shown, prevent the formation of the radiation-absorbing dye in the exposed areas. Subsequent development of the photoimaged layer (7) produces an imagewise pattern of the radiation-absorbing dye corresponding, as shown in FIG. 1d, to the unexposed areas of the photoimaged layer.

Referring to FIGS. 2a to 2c, the photosensitive layer (7) is coated as an underlayer, but imaged prior to coating of the magnetic recording layer (5). Alternatively, the element may be used as shown in FIG. 2b as a single layer material.

SUMMARY OF INVENTION

Figure 1A:
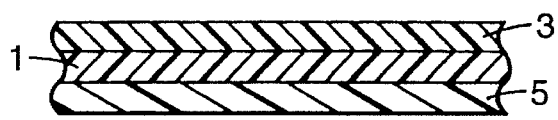
FIGS. 1a to 1d illustrate schematically the preparation of one embodiment of magnetic recording element in accordance with the invention.
Figure 1B:
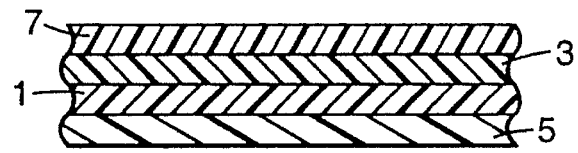
Figure 1C:
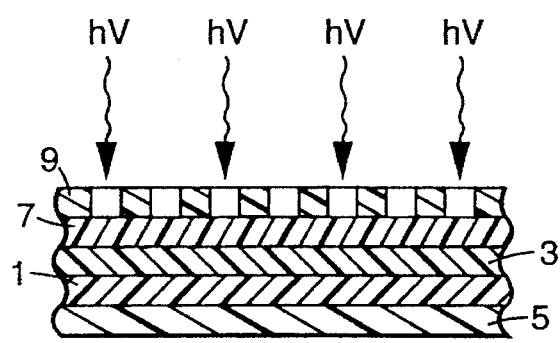
Figure 1D:
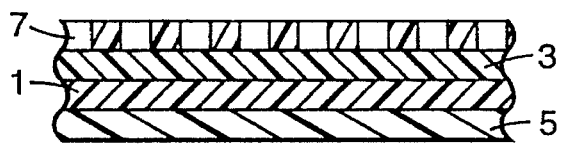
Figure 2A:
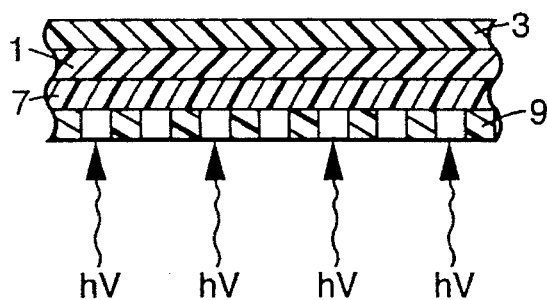
FIGS. 2a to 2c illustrate an alternative method of preparing the magnetic recording element.
Figure 2B:
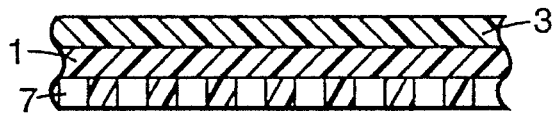
Figure 2C:
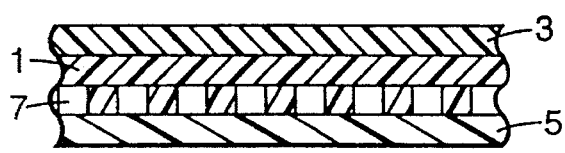

According to one aspect of the present invention, there is provided a method of recording information on a magnetic recording element comprising at least one magnetic recording layer, which method comprises:

providing the element with a photosensitive layer in which the generation or destruction of a radiation-absorbing dye is either promoted or inhibited by exposure to actinic radiation, said layer being separate from or integral with any magnetic recording layer, and imagewise exposing the photosensitive layer to actinic radiation to record said information.

According to a second aspect of the present invention there is provided a magnetic recording element comprising a support having coated on at least one major surface thereof a layer of a magnetic recording medium and a photosensitive layer which may be separate from or integral with the recording layer in which the generation or destruction of a radiation-absorbing dye is either promoted or inhibited by exposure to actinic radiation.

According to a third aspect of the present invention there is provided a magnetic recording element comprising a support having coated on at least one major surface thereof a layer of a magnetic recording medium and a layer comprising information obtained by providing the element (either before or after coating of the magnetic recording layer) with a photosensitive layer which may be separate from or integral with the magnetic recording layer in which the generation or destruction of a radiation-absorbing dye is either promoted or inhibited by exposure to actinic radiation and imagewise exposing the photosensitive layer to record said information.

DETAILED DESCRIPTION OF THE INVENTION

The primary purpose of the present invention is to provide optical servo tracking information, but it can also be used as a means for distinguishing a genuine article from a copy lacking such information. Thus, by imaging the very material on which a recording, e.g., of a concert or film, is to be made with a unique code, the manufacturer can, by controlling the supply of material so marked, make the task of a potential counterfeiter much more difficult. The present invention may likewise have applications in security card systems, e.g., by making the counterfeiting of credit, charge and bankers cards more difficult.

The method of the invention is applicable to a wide variety of magnetic recording materials, although it finds particular utility in the preparation of magnetic tapes, disks, diskettes, cards, drums and data cartridges for a variety of audio, video, instrumentation and computer uses. Such materials generally comprise a support having coated on at least one major surface, and ordinarily on two opposing sides thereof, a layer of a magnetic recording medium. The photosensitive layer may be coated as an under or an overlayer to the magnetic recording medium. The photosensitive layer may be provided on one or both sides of the element, and in the case of a single media layer materials, the photosensitive layer may be provided on the same or on the reverse (non-coated) side of the support.

The present invention has the advantage that the photosensitive layer can be solvent-coated with minimum disruption of the normal coating process, either before coating the magnetic recording medium or, as an add-on step, on top of the magnetic medium. There are certain advantages associated with the latter arrangement in that the magnetic medium is not required to be transparent to the exposing radiation, and imaging can be carried out after conversion. Even when the photosensitive layer is situated below the magnetic medium, imaging through the base is possible (in the case of single-sided magnetic materials or double-sided materials, when the magnetic layer is sufficiently transparent), by virtue of the dry processing capability.

The photosensitive layer generally comprises a radiation-absorbing dye or the precursor(s) to such a dye, and may be separate from or integral with the magnetic recording layer. By "integral" is meant that the radiation-absorbing dye or any precursor(s) thereof are formulated in the magnetic recording layer, typically by admixture with the precoating mix. The former arrangement is preferred.

Where the photosensitive layer contains the precursor(s) to the radiation-absorbing dye, the generation of that compound is either promoted or inhibited by exposure of the layer to actinic radiation. Where the photosensitive layer contains the radiation-absorbing dye, the destruction of the radiation-absorbing dye is either promoted or inhibited by irradiation of the photosensitive layer. A thermal processing step may be included to generate or destroy the radiation-absorbing dye. In either case, it is the difference in absorption characteristics between the exposed and unexposed regions of the imaged layer when illuminated by a suitable radiation source, which is utilised to provide the information. Of course, any such generation or destruction of the radiation-absorbing dye need only be sufficient to create a detectable difference in absorbance between the exposed and unexposed regions of the element. Accordingly, the term "destroy" is used herein in its broadest sense as encompassing not only the photo- or thermal-mediated destruction of the radiation-absorbing dye, but also a reduction in absorbance (optical density) at the wavelength of the illuminating radiation source caused by a shift in the absorbance of the radiation-absorbing dye in the exposed regions of the photosensitive layer.

The radiation-absorbing dye ordinarily comprises an organic dye, although any compound possessing the requisite properties, i.e., selective generation or destruction on exposure to actinic radiation, may be used in the practice of the invention. Suitable dyes and their precursors are known. Preferred radiation-absorbing dyes absorb in the red and infrared regions, typically from 600 to 1070 nm, with dyes absorbing in the region 750 to 980 nm especially preferred, to ensure compatibility with existing magnetic disk drives using optical servo tracking, such as the FLOPTICAL disk drive from Insite Peripherals Inc. Of course, the illuminating radiation source and radiation-absorbing dye would ordinarily be selected such that the output radiation closely matches the wavelength of maximum absorption of the radiation-absorbing dye, in order to make effective use of the available energy.

The photosensitive layer may be imaged by any of a number of techniques well known in the field of imaging technology. For example, a scanning exposure source, such as a scanning laser, modulated in accordance with digitally stored information may be scanned directly over the photosensitive layer. This method of imaging is capable of producing very high resolution images.

A preferred method of imaging involves flood exposure through a suitable mask held in contact with the magnetic recording element. Provided the mask itself is of high quality (as would be provided, for example, by a silver halide film, such as a graphic arts film), then this method of imaging is also capable of producing high resolution images. It also has the added advantage that the entire image (regardless of size) may be produced with a single exposure of relatively short duration.

As stated previously the radiation-absrobing dye preferably absorbs in the infrared area of the spectrum. In contrast, when imaging the photosensitive layer, there is no such restriction on the wavelength of the exposure source; the photosensitive layer may be sensitive to any wavelength of actinic radiation. Nevertheless, the wavelength used for imaging should be different from that used for reading information to prevent imaging from occurring when information is being read from the pre-imaged layer.

The photosensitive layer may comprise any of a number of photosensitive systems including both wet and dry processed materials. Dry processed materials, especially heat-processed materials, requiring no chemical development, are preferred. The choice of photosensitive chemistry used will depend primarily on the construction and purpose of the magnetic recording element, as well as the function/purpose of the information to be recorded.

For servo purposes, the difference in absorption characteristics between the exposed and the unexposed regions of the imaged layer is used to provide a servo pattern. When exposed to the radiation source of the optical tracking system, such as the LED of the FLOPTICAL System, the regions of the imaged layer in which little or no radiation-absorbing dye is formed or remain appear brighter than those regions where the dye absorbs the incident light. After magnification, the image of the disk surface is directed to photodetectors where the light is converted to an electronic signal used to align the read/write head.

Read, write and erase functions are performed as per conventional magnetic recording systems.

After imaging, the radiation-absorbing dye must be present in an amount and distribution sufficient so that absorption by the dye of the exposing radiation from the optical system will create a detectable difference between the exposed and unexposed regions of the photosensitive layer. The difference in reflectivity or transmission between the exposed and unexposed regions of the imaged layer will depend on the particular optical system employed, but is preferably at least 3%, more preferably at least 6% and most preferably 9% or greater. The amount of radiation-absorbing dye or precursor(s) required will vary widely depending on the nature of the dye/precursor used etc., but it is preferably present in an amount sufficient to provide (post-imaging) a transmission optical density of at least 0.5 absorbance units at the wavelength of the radiation used for reading the image.

In one preferred embodiment, the photosensitive layer comprises one or more precursors to a near-infrared-(NIR)- or infrared-(IR)-absorbing dye, ordinarily dissolved or dispersed in one or more binder layers, wherein exposure of the photosensitive layer promotes or inhibits the formation of the radiation-absorbing dye in the exposed regions.

Examples of photosensitive systems suitable for use with the present invention include:

(1) A coating comprising a mixture of: a dipyridyl compound, such as a 4,4'-dipyridyl compound (I), and a photosensitive cyclopropenone compound, such as 1,2-diphenylcyclopropenone (II) which, when heated, react to generate an oxoindolizine dye (III) as exemplified by the following reaction scheme (see EP 0068876):

nylethylene, such as 1,1-bis(4'-dialkylamino)phenylethylene (V), and a photochemical source of strong acid, such as a triarylsulphonium salt (VI). When exposed to actinic radiation and heated, a NIR-absorbing dye (VII) is produced, as exemplified by the following reaction scheme:

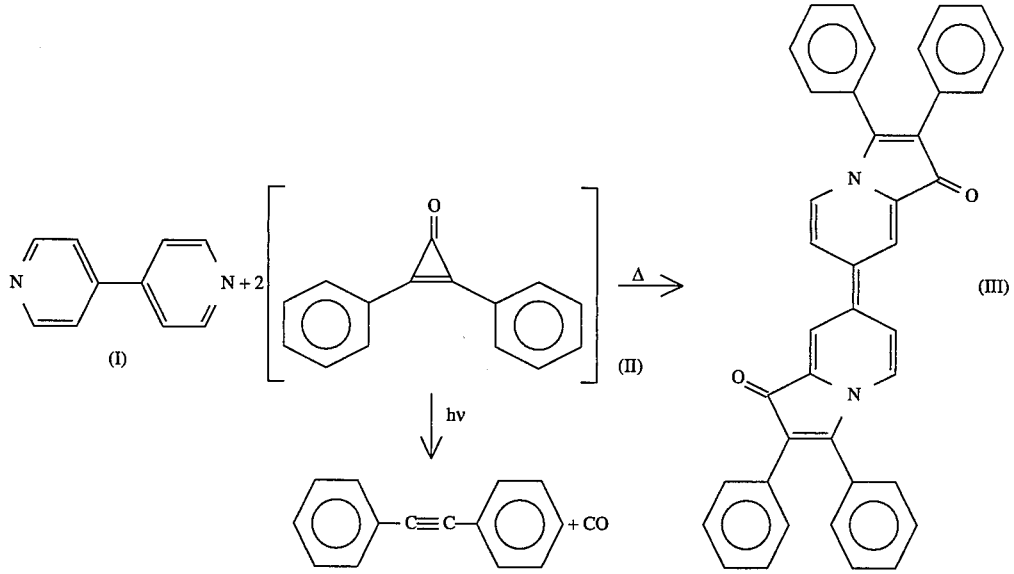

Preheating imagewise exposure to UV radiation destroys the cyclopropenone compound in the exposed regions, thereby limiting dye formation to the unexposed regions of the magnetic recording element.

(2) A coating comprising a mixture of: a trialkyl orthoester, such as triethylorthoformate (IV); a dialkylaminophe-

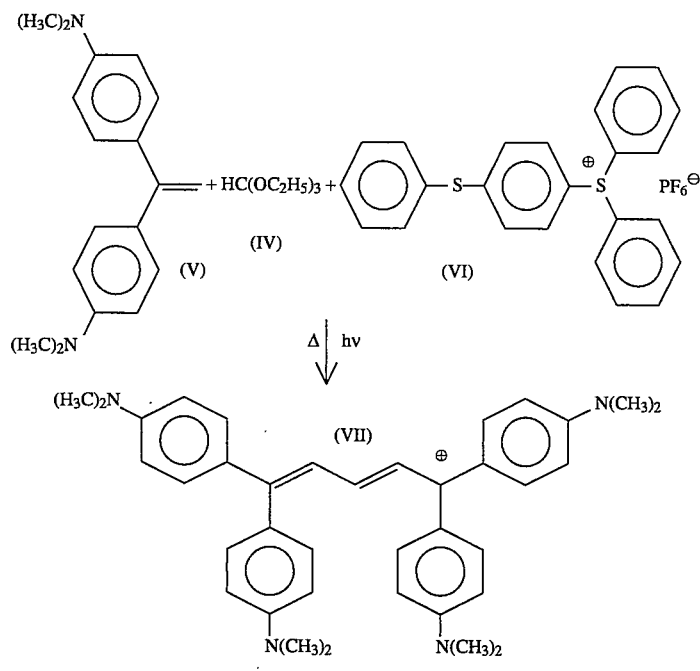

A variety of trialkyl orthoesters may be used, e.g., triethyl orthoformate, triethyl orthoacetate, trimethyl orthobenzoate etc. The photochemical source of strong acid is a compound which releases a strong acid ($pKa<1$) on exposure to actinic radiation. Well-known examples include (but are not limited to) diaryliodonium salts and triarylsulphonium salts in which the anion is a species such as $PF_6^-$, $AsF_6^-$, $BF_4^-$, $SbF_6^-$, $CF_3SO_3^-$ etc. A sensitiser may optionally be included to extend the spectral sensitivity, as is well known in the art.

In another preferred embodiment, the photosensitive layer comprises a NIR- or IR-absorbing dye, ordinarily dispersed in one or more binder layers, whose destruction is either promoted or inhibited upon exposure to actinic radiation. The destruction occurs by use of a photolysable compound. For example, the coating may comprise a photolysable acid generator and a pH-sensitive dye, such as 4-dimethylaminoazobenzene or N,N-dimethyl-4-phenylazoaniline. Exposure to actinic radiation generates acid in the exposed areas, which causes a colour change in the dye. The aforementioned sulphonium and iodonium salts may be used as the acid generator, as well as diazonium salts and other halogenated materials, such as carbon tetrabromide, hexabromoethane, tris(trichloromethyl) triazine, trichlormethyl pyrones, and polymers and copolymers of vinyl chloride, which are known to generate hydrogen chloride and other hydrohalic acids on exposure to UV or electron beams.

When the photosensitive layer is present as an overlayer, the radiation-absorbing dye or the precursor(s) thereof is advantageously formulated in a thermosetting resin, preferably a binder having a high glass-transition temperature (Tg) or a cross-linkable binder, to provide toughness and wear-resistant properties. It should be sufficiently durable to allow repeated reproduction of the information recorded on the element. By "durable" is meant that the photoimaged layer should be firmly bound to the element and not worn off by the passage of the magnetic recording head over the medium. This durability should persist under all conditions under which the medium is or may be used. It is also desirable that the photoimaged layer be sufficiently smooth to enable accurate reading of the recorded information by the magnetic head. It should also be free from surface asperities and other surface roughness that can lower the signal to noise ratio.

The photosensitive layer is normally coated as a solution or dispersion in a suitable solvent, e.g., lower alcohols, ketones, esters, chlorinated hydrocarbons, and mixtures thereof. Any of the well-known solvent-coating techniques may be used, such as knife-coating, roller-coating, wire-wound bars etc. The thickness of the photosensitive layer must be sufficient to provide the necessary optical density, and will depend on factors such as the extinction coefficient of the dye used or formed, its solubility in the binder etc. The (post-imaged) photosensitive layer preferably has an overall thickness not greater than about 45 nm, more preferably not greater than 40 nm, to avoid spacing losses, although thicker coatings may be used when the photosensitive layer is present as an underlayer or, in the case of single media layer materials, coated on the reverse (non-coated) side of the support.

Where the photosensitive layer is provided as an underlayer to the magnetic recording medium, then either the support (in the case of single-sided magnetic materials) or the magnetic recording medium must be transparent to the radiation emitted from the optical system used to read the recorded information.

The magnetic recording media used in the invention may be prepared using conventional techniques known in the art. A good summary of the principles of manufacturing magnetic tapes and disks may be found in "The Complete Handbook of Magnetic Recording—Chapter 13 entitled Manufacture of Magnetic Tapes and Disks" by Finn Jorgensen (3rd Edition - ISBN 0-8306-1979-8).

Particulate-based magnetic recording media are ordinarily produced by passing a non-magnetic support through an apparatus which coats the support with a liquid dispersion of the magnetic medium. This dispersion consists of a binder, in either an uncured or solvated state, having the magnetisable particles homogeneously dispersed therein. After coating, the dispersion dries or cures to give a tough binder film having the magnetisable particles uniformly distributed throughout.

Generally, the magnetisable particles are dispersed in a solution of a chemically curable binder using conventional mixing procedures, such as kneading, ball milling (both horizontal and vertical), pebble milling, sand milling, sand shaking etc., followed by filtration to remove lumps, aggregates, agglomerates and foreign matter which cannot be tolerated in the coating mix, dearation and finally the addition of solvent (if required) to provide the desired coating viscosity.

A preferred curable coating resin system is an isocyanate curable resin system including: partially hydrolyzed copolymers of vinyl chloride and vinyl acetate, a terpolymer of vinyl chloride, vinyl acetate and vinyl alcohol (VAGH, available from Union Carbide), a terpolymer of vinyl chloride, vinyl acetate and maleic acid, a partially hydrolized copolymer of vinyl chloride and vinylidene chloride, nitrocellulose, phenoxy(bisphenol-epoxy), polyester urethanes, and other hydroxy containing polymers, polyols, such as glycerol and trimethylolpropane, and phenoxides, such as PKHH, commercially available from Union Carbide.

Isocyanate compounds suitable for use as curing agents are preferably aromatic and at least difunctional. Examples of suitable aromatic isocyanate compounds include MONDUR CB-601, commercially available from Mobay Chemical Corporation and DESMODUR L75, commercially available from Farbenfabriken Bayer AG.

Other preferred binder materials are disclosed in our copending International Patent Application No. PCT/U.S. Pat. No. 90/02792 filed May 21, 1990 and our copending British Patent Application No. 9114668.8 filed Jul. 8, 1991. These materials comprise linear and star-shaped block copolymers comprising one or more hard, glassy polymeric segments and one or more blocks of a soft, rubbery polymeric segment. The term "star" describes the structure of a multi-arm copolymer in which the arms are joined together at a nucleus formed by a coupling or linking moiety. Star-shaped block copolymers in which the hard, glassy polymer makes up at least 50% by weight of the binder are preferred.

The solvent is generally contained in the magnetic paint in an amount of from 50 to 600 parts by weight based on 100 parts by weight of the magnetisable particles.

The magnetic paint may also comprise one or more conventional additives known in the art, such as lubricants; abrasives, e.g., aluminum oxide; thermal stabilisers, e.g., octadecyl-3,5-di-tert-butyl-4-hydroxyhydrocinnamate; antioxidants; dispersants; wetting agents; anti-static agents, e.g., soot, graphite; fungicides; bacteriocides; surfactants; coating aids; non-magnetic pigments, e.g., abrasive, reflective and conductive pigments, and the like. Such additives may comprise up to 50 parts by weight based on 100 parts by weight of the magnetisable particles.

Examples of lubricants include saturated and unsaturated fatty acids, fatty acid esters, higher fatty acid amides, higher alcohols, silicone oils, mineral oils, fluorinated polymers, such as perfluoroethers, and the like.

In situations where the photosensitive layer is coated on top of the magnetic media, abrasives and lubricants are preferably incorporated in said layer rather than in the magnetic media.

Examples of antioxidants which may be used in the magnetic media of the present invention include salicylanilide, tin oxide, mercury phenyloctoate, copper naphthenate, zinc naphthenate, trichlorophenol, dinitrophenol, sorbic acid, butyl p-hydroxybenzoate, and the like.

Dispersing agents serve to improve the wetting of the magnetic pigment particles by the binder, and so enhance their uniform dispersion within the binder. The presence of unwetted particles can lead to pigment agglomeration, which causes deterioration of the signal to noise ratio of a recording. Effective dispersants include acrylates, carboxylate polyesters, phosphate esters, phosphate ethers, titanate coupling agents, lecithin, alkyl sulphates, fatty acid amides and the like.

Non-magnetic pigments which may be added include silicon oxide, titanium oxide, aluminum oxide, chromium oxide, calcium carbonite, zinc oxide, talc, kaolin, silicon carbide, carbon black and the like.

Any of the conventional procedures known in the art may be used to cast the coating mix to form a self-supporting film serving as an integral magnetic recording element, or to coat the mix onto a suitable material to form a supported magnetic recording element. For example, direct gravure coating systems, such as offset gravure coaters and reverse roll coaters, and unipped coating systems, such as knife coaters etc., may be used to prepare the media. Spinning and spraying techniques may also be used to prepare magnetic disks.

The thickness of the magnetic recording layer is dependent on the nature of the recording element but generally for tapes, cards and disks, the thickness of the layer would typically be from 0.4 to 504 μm.

Suitable base materials for supported magnetic recording elements are known in the art and typically comprise a non-magnetic support. For tapes and flexible disks, suitable base materials include poly(ethylene terephthalate), commercially available under the trade name MYLAR, poly-(ethylene-2,6-naphthalate), poly(ethylene), poly(propylene), polycarbonates, polyamides, poly(vinyl chloride), cellulose acetate, cellulose triacetate etc. For hard disks, suitable base materials include aluminum. In some instances, for example, when sheets of poly(ethylene terephthalate) are used, it may be advantageous to apply an intermediate layer, e.g., based on vinylidene chloride copolymers or saturated polyesters, in order to improve the adherence of the magnetic layer for the support. The thickness of the base film is typically from 3 to 100μm.

The non-magnetic support may be coated on one or both sides and when coated on one side only, the non-coated (near side of the support) may be coated with a binder material containing carbon black or other static reducing non-magnetic pigments. Once coated, the magnetisable particles may be subjected to one or more after treatments, such as magnetic orientation, prior to drying the coating. Once dry, the coated layer may be subjected to further treatments, such as calendering to compact the binder and smooth its surface, burnishing and/or buffing and aging to remove residual solvent not removed in the drying process, before cutting into the desired shape and size.

The solvent content of the coating is evaporated during the drying stage, typically by passage through an oven, infrared heater, microwave oven, and the like. The actual choice of coating solvent is largely governed by the particular solubility characteristics of the binder, but it should not be reactive with any other component of the medium. Preferred solvents are toluene, cyclohexanone, tetrahydrofuran, methyl ethyl ketone and mixtures thereof.

The magnetisable particles may comprise any of the magnetisable materials known in the art but are typically finely divided magnetic particles including particles of magnetic oxides, such as gamma hematite ($\gamma$-$Fe_2O_3$), magnetite ($Fe_3O_4$), mixed crystals of ($\gamma$-$Fe_2O_3$), and ($Fe_3O_4$), Co-doped $Fe_2O_3$, Co-doped $Fe_3O_4$, Co-doped mixed crystals of $Fe_2O_3$ and $Fe_3O_4$, barium ferrite, Berthollide compounds; various kinds of acicular magnetic alloy powders, such as Fe, Fe-Co, Co-Ni, Fe- Co-Ni, Co-Cr, $CrO_2$, Fe-Co-B, Fe-Co-Cr-B, Fe-Co-V, Mn-Bi, Mn-Al etc.; nitrides of Fe, Fe-Co, Fe-Co-Ni, fine iron etc., and mixtures of two or more of the above. A preferred magnetic material is barium ferrite.

Alternatively, the magnetic media may comprise a continuous magnetic film of the type used in perpendicular recording. This particular technology is possible due to the discovery that certain continuous magnetic films, such as CoCr, have a perpendicularly orientated crystalline anisotropy, which is large enough to overcome demagnetization. High density packing can be achieved due to the CoCr alloy microstructure, which provides magnetically isolated small grains. The grain diameter is approximately 50 nm, employing a maximum density of approximately 200 kilo flux changes per centimeter. Due to this property of the alloy, much higher densities can be achieved compared to conventional particulate systems, with an additional advantage of a much smoother surface, and hence improved head to media contact. Such media are referred to herein as "metallic thin film magnetic medial".

The thin film magnetic media can be formed by sputtering, evaporation etc., from many different alloys, such as CoCr, CoNi, CoCrNi etc. Although these metallic films are very promising as high density recording media, they are susceptible to surface abrasion, and additionally cause excessive head wear. Moreover, transducer heads contacting the metallic thin film will have a tendency to erode or otherwise damage it. Even slight erosion will result in considerable loss of data when high bit density recording is employed.

Various attempts have been made to alleviate the problem of alloy wear. In particular, lubricating systems have been used as protective layers for thin film magnetic media, including metal layers, using various soft and hard non-magnetic metals, organic layers and mixtures of both. Photosensitive layers as described herein may be used for protection and/or lubrication of metallic thin film magnetic media.

The invention will now be described with reference to the following non-limiting Examples, in which the photosensitive layer(s) were overcoated on a standard, flexible 8.75 cm (3.5 inch) magnetic diskette (commercially available from 3M) of imbyte storage capacity.

EXAMPLE 1

A series of magnetic recording elements in accordance with the invention were prepared as follows.

Each element comprises a first layer prepared by dispensing a solution (10 ml) of defined composition (see TABLE 1) onto a horizontally spinning 8.75 cm (3.5 inch) diskette under clean conditions.

TABLE 1

| Composition of First Layer (g) | Element No. | | | |
|---|---|---|---|---|
| | 1 | 2 | 3 | 4 |
| 4,4'-dipyridyl | 0.01 | 0.02 | 0.05 | 0.20 |
| VAGH terpolymer* | 0.03 | 0.06 | — | — |
| DESMODUR L75** | 0.02 | 0.04 | — | — |
| methylethylketone | 13.70 | 10.88 | 9.95 | 9.80 |

*VAGH is a hydroxyl-modified vinyl chloride-vinyl acetate copolymer, having a composition of approximately 90% vinyl chloride, 4% vinyl acetate with a hydroxyl content of approximately 2.3%, supplied by Union Carbide.

**DESMODUR L75 is a polyisocyanate supplied by Farbenfabriken Bayer AG.

The first layer was air dried at ambient temperature for 30 minutes before application of an overlayer prepared by dispensing a solution (10 ml) of defined composition (see TABLE 2) under identical spin conditions.

TABLE 2

| Composition of Second Layer (g) | Element No. | | | |
|---|---|---|---|---|
| | 1 | 2 | 3 | 4 |
| 1,2-diphenylcyclopropenone | 0.01 | 0.02 | 0.05 | 0.20 |
| VAGH terpolymer | 0.03 | 0.06 | — | — |
| methylethyl ketone | 9.96 | 7.92 | 9.95 | 9.80 |

Each coated element was imaged by exposure to a 250W UV mercury lamp through a suitable mask for 40 seconds at a distance of 7.6 cm and then heated at 150° C. for 30 seconds to produce a NIR-absorbing oxoindolizine dye (Dye III) in the unexposed regions according to the reaction scheme detailed earlier. The thickness of the bilayer coating was estimated via ellipsometric analysis.

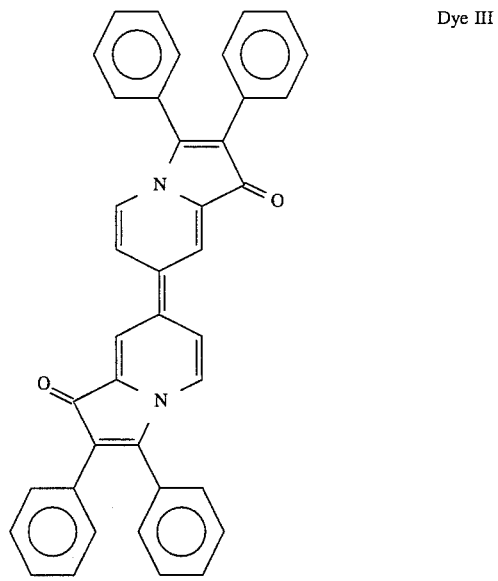

Dye III

A TECHWAY 8.75 cm (3.5 inch) external drive modified to provide an oscilloscope trigger signal was used to determine the storage capacity (to a maximum of kbytes) and the amplitude of the recorded signal waveform when compared to a Control (unmodified) diskette. The results obtained are shown in TABLE 3.

TABLE 3

| Element No. | Storage Capacity | | Waveform Amplitude* | Bilayer Thickness |
|---|---|---|---|---|
| | (kbytes) | (% of total) | (mv) | (±5 nm) |
| 1 | 324 | 90 | ND | 45 |
| 2 | — | — | 81 | >45 |
| 3 | 328 | 91 | 129 | ND |
| 4 | 223 | 62 | 113 | >45 |

*Control (unmodified) diskette displayed a signal amplitude of 140 mV.
ND = not determined.

The results show that magnetic recording elements prepared in accordance with the invention can be formatted to >90% of potential storage capacity with <10% degradation in the output signal, demonstrating compatibility with conventional disk drives.

The specular reflectivity of Element 1 was recorded using a PERKIN-ELMER Lambda 9 spectrophotometer through the wavelength range 200 to 2000 nm. A reflectivity difference of greater than 9% between imaged and non-imaged areas of the diskette was recorded, indicating suitability for use with optical tracking means.

EXAMPLE 2

In order to confirm the presence of the NIR-absorbing oxoindolizine dye (Dye III) in the elements detailed in Example 1, the following extraction/UV-VIS absorption experiment was performed:

(i) A series of standard 8.75 cm (3.5 inch) diskettes were coated with the under and overlayers defined in TABLES 1 and 2.

(ii) Each coated element was heated to 150° C. for 30 seconds as detailed in Example 1.

(iii) One half of each element was masked and the other UV-exposed to a 250W mercury lamp at a distance of 7.6 cm for 40 seconds as detailed in Example 1, to destroy any cyclopropenone remaining after heating and to prevent dye formation in solution during the extraction step (iv).

(iv) The exposed and unexposed areas of each element were extracted into chloroform (10 ml) for 5 hours.

(v) The UV-VIS absorption spectrum of both extracts was then measured across the range 300 to 950 nm.

Absorption maxima were observed for each coating at 450 and 800 nm, thereby confirming the presence of the dye.

EXAMPLE 3

A mixture of 1,2-diphenylcyclopropenone and 4,4'-dipyridyl (2:1) in a poly(methylmethacrylate) binder was coated as a 2% solution from a 2,2-dichloroethane:cyclohexanone [4:1] solvent system onto a polyester support (100 μm) and irradiated through an UGRA resolution target using a 300W mercury lamp for 60 seconds at a distance of 8 cm. The imaged coating displayed a resolution of 4μm on subsequent heat development at 98° C. for 3 minutes, thereby demonstrating the potential of the present invention for generating optical servo tracking information.

EXAMPLE 4

A solution comprising Dye VII (0.225 g), RJ100 (0.116 g; a styryl/2-propen-1-ol copolymer commercially available from Monsanto), a polyurethane resin (0.350 g) of the type referred to as MHFU-II in U.S. Pat. No. 4,837,082, DES- MODUR L75 (0.284 g) and cyclohexanone (100 ml) was spin-coated onto a standard 8.75 cm (3.5 inch) diskette under two spin conditions: 1500 rpm and 1000 rpm. Each coated diskette was stored at room temperature for 24 hours prior to testing.

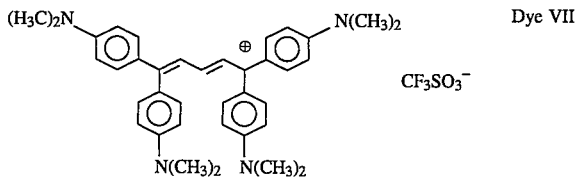

Dye VII

With a coater speed of 1500 rpm, the overcoat produced was estimated via ellipsometric analysis to be 32 nm thick. The element so produced was formatted to >99% capacity using the TECHWAY drive system detailed in Example 1. When subjected to an extended wear stability test, the element completed $4.50 \times 10^6$ repeat read cycles without failure.

With a coater speed of 1000 rpm, the overcoat produced was estimated via ellipsometric analysis to be 40 nm thick. The element so produced was formatted to 100% capacity and completed $1.70 \times 10^6$ repeat read cycles without failure. This provides further proof that these dye-containing overlayers do not impair the performance of diskettes in a conventional disk drive.

EXAMPLE 5

A solution comprising 1,2-diphenylcyclopropenone (0.112 g), 4,4'-dipyridyl (0.112 g), RJ100 (0.116 g), DESMODUR L75 (0.2849), the polyurethane resin (0.350 g) used in Example 4, and cyclohexanone (100 ml) was spin-coated at a speed of 1000 rpm onto a standard 8.75 cm (3.5 inch) diskette. The coated element was imaged by exposure to a 6 kW (NuArc)KT 38 lamp through a suitable mask for 25 seconds at a distance of 1 m and then heated at 95° C. for 5 minutes to produce the NIR-absorbing oxoindolizine dye (Dye III) in the unexposed regions. The element so produced was formatted to >97% capacity and completed $25 \times 10^3$ repeat read cycles without failure.

EXAMPLE 6

A solution comprising 1,1-bis(4'-dimethylamino) phenylethylene (0.173 g), triethylorthoformate (0.052 g), FX-512 (0.173 g; a sulphonium salt photoinitiator commercially available from Minnesota Mining & Manufacturing Co.), the polyurethane resin (0.350 g) used in Example 4, RJ100 (0.116 g), and DESMODUR L75 (0.284 g) in cyclohexanone (100 ml) was spin-coated onto two 8.75 cm (3.5 inch) diskettes at speeds of 1000 rpm and 500 rpm. The coated disks were each exposed to UV radiation as in Example 5 through a suitable mask and heat treated as detailed in Example 5 and then washed in aqueous acetic acid (10% solution), followed by water, to remove any unreacted photoinitiator.

The disk coated at 1000 rpm could be formatted to 100% capacity (720 kbytes) and completed $22 \times 10^3$ repeat read cycles without failure. The disk coated at 500 rpm could be formatted to >95% capacity and completed $> 34 \times 10^3$ repeat read cycles without failure.

Glossary

DESMODUR L75 (Farbenfabriken Bayer AG), FLOPTICAL (Insite Peripherals Inc.), VAGH (Union Carbide), PKHH (Union Carbide), RJ100 (Monsanto), MYLAR (DuPont), CB-601 (Mobay Chemical Corporation) and FX 512 (3M Co.) are all trade names/designations.

We claim:

1. A magnetic recording element comprising a support having coated on at least one major surface thereof a layer of a magnetic recording medium and a photosensitive layer, which may be separate from or integral with the magnetic recording layer, wherein optical servo tracking information is imparted to the element by imagewise exposure of the photosensitive layer to activating actinic radiation which causes imagewise generation or destruction of a radiation absorbing dye or promotes or inhibits the generation or destruction of a radiation-absorbing dye upon heat development.

2. The magnetic recording element of claim 1 comprising a support having coated on two opposing sides thereof a layer of the magnetic recording medium and on at least one of said two opposing sides, as a separate overlayer or an underlayer to the magnetic recording layer, the photosensitive layer.

3. The magnetic recording element of claim 1 wherein the radiation-absorbing dye absorbs radiation in the red or infrared region of the spectrum.

4. The magnetic recording element of claim 3 in which the radiation absorbing dye absorbs radiation having wavelengths between 600 and 1070 nm.

5. A magnetic recording element comprising a support having coated on at least one major surface thereof a layer of a magnetic recording material and a photosensitive layer, in which the photosensitive layer comprises a mixture of a 4,4'-dipyridyl compound (I) and 1,2-diphenylcyclopropenone (II) which generates on heating, in regions of the photosensitive layer which have not been exposed to activating actinic radiation, an oxoindolizine dye (III) according to the following reaction scheme:

6. A magnetic recording element comprising a support having coated on at least one major surface thereof a layer of a magnetic recording material and a photosensitive layer, in which the photosensitive layer comprises a radiation absorbing dye and a photolysable compound, wherein exposure of the photosensitive layer causes destruction of the dye in the exposed areas by decomposition products of the photolysable compound.

7. A magnetic recording element as claimed in claim 6 in which the photosensitive layer comprises a pH-sensitive dye and a photolysable acid generator.

8. The magnetic recording element of claim 1 in which the difference in reflectivity or transmission between regions exposed to actinic radiation and unexposed regions is at least 3%.

9. The magnetic recording element of claim 1 in which the magnetic recording medium comprises either a dispersion of magnetizable particles in a binder or a continuous magnetic film.

10. The magnetic recording element of claim 2 in which the photosensitive layer is an overlayer with a thickness of less than 45 nm.

11. A method of recording optical servo tracking information on a magnetic recording element comprising at least one magnetic recording layer, which method comprises:

providing the element with a photosensitive layer in which exposure of the photosensitive layer to activating actinic radiation causes generation or destruction of a radiation absorbing dye or promotes or inhibits the generation or destruction of a radiation-absorbing dye upon thermal processing, said layer being separate from or integral with any magnetic recording layer, and imagewise exposing the photosensitive layer to actinic radiation to record said information.

12. A method as claimed in claim 11 further comprising a thermal processing step to generate or destroy the radiation absorbing dye.

13. The method of claim 11 in which the photosensitive layer is imaged by a flood exposure source through a mask bearing the information which is to be recorded onto the element.

14. The method of claim of claim 11 in which a scanning exposure source modulated in accordance with digitally stored information is scanned directly over the photosensitive layer.

15. A magnetic recording element comprising a support having coated on at least one major surface thereof a layer of a magnetic recording medium and a photosensitive layer, which may be separate from or integral with the magnetic recording layer, wherein exposure of the photosensitive layer to activating actinic radiation causes generation or destruction of an infrared radiation absorbing dye or promotes or inhibits the generation or destruction of an infrared radiation-absorbing dye upon heat development.

16. The magnetic recording element of claim 15 wherein information is contained in the photosensitive layer by imagewise exposure to actinic radiation.

17. A magnetic recording element comprising a support having coated on at least one major surface thereof a layer of a magnetic recording medium and a photosensitive layer, which may be separate from or integral with the magnetic recording layer, wherein information providing a means to distinguish a genuine article from a copy is imparted by imagewise exposure of the photosensitive layer to activating actinic radiation which causes, promotes, or inhibits imagewise generation or destruction of an infrared radiation absorbing dye.

18. A magnetic recording element as is claim 17 wherein the photosensitive layer comprises a mixture of triethylorthoformate (IV), a 1,1-bis(4'-dialkylamino(phenylethylene) (V) and a triarylsulphonium salt (VI) which when heated produces in the exposed regions of the photosensitive layer a near infrared-absorbing dye (VII) according to the following reaction scheme:

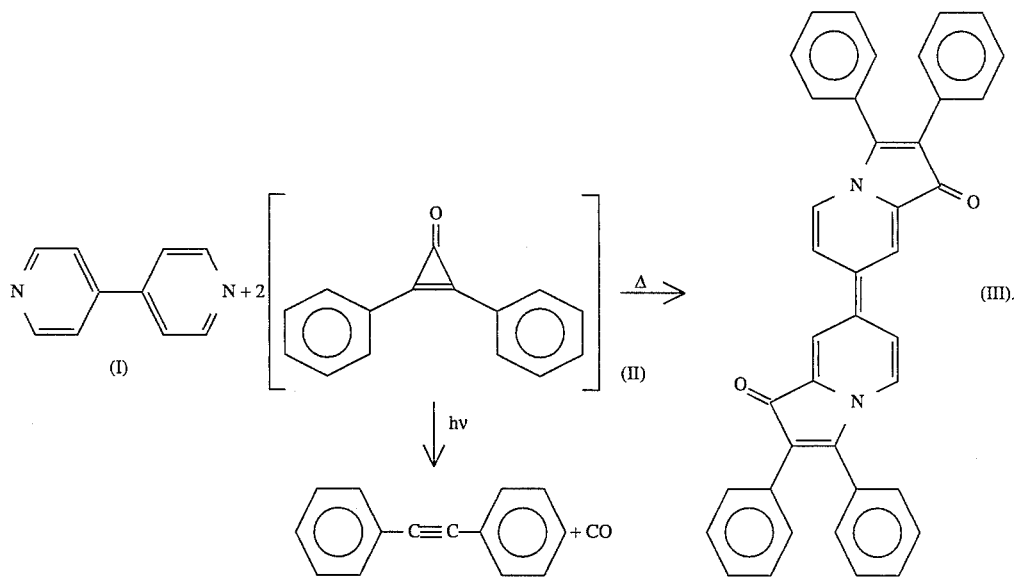

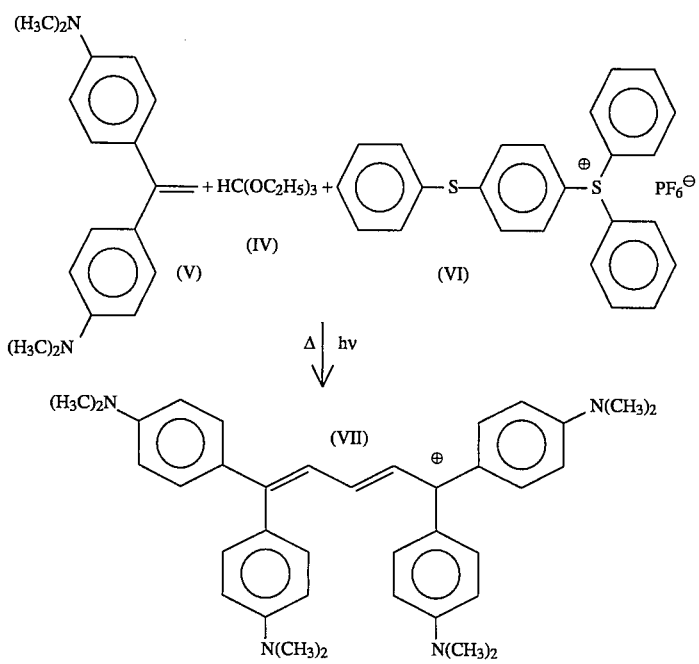

19. The magnetic recording element of claim 15 in which the difference n reflectivity or transmission between regions exposed to actinic radiation and unexposed regions is at least 3%.

20. The magnetic recording element of claim 17 in which the difference in reflectivity or transmission between regions exposed to actinic radiation and unexposed regions is at least 3%.

21. The method of claim 11 wherein the photosensitive layer comprises a mixture of a 4,4'-dipyridyl compound (I) and 1,2-diphenylcyclopropenone (II) which generates on heating, in the regions of the photosensitive layer which have not been exposed to activating actinic radiation, an oxoindolizine dye (III) according to the following reaction scheme:

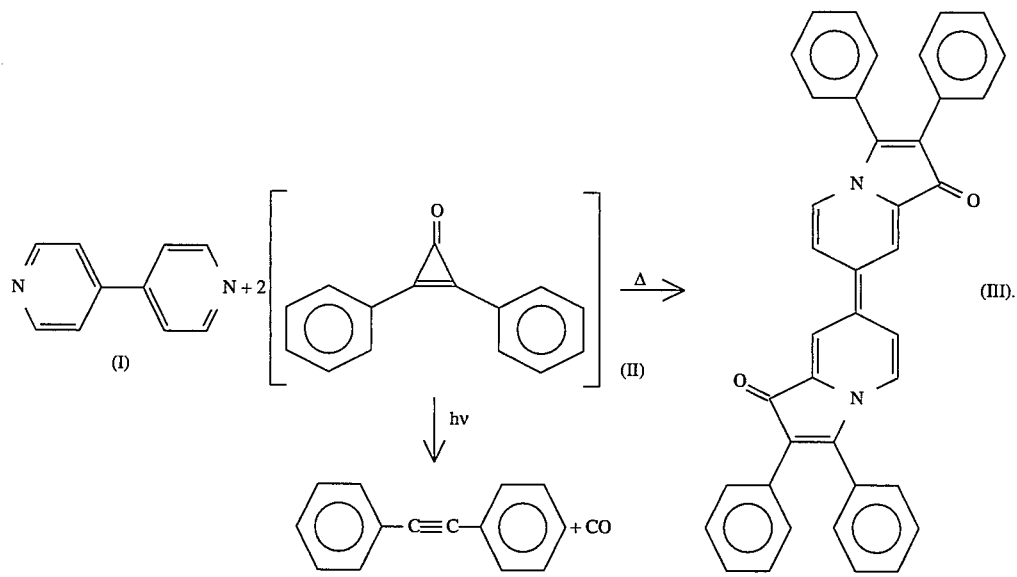

22. The method of claim 11 wherein the photosensitive layer comprises a mixture of triethylorthoformate (IV), a 1,1-bis(4'-dialkylamino(phenylethylene) (V) and a triarylsulphonium salt (VI) which when heated produces in the exposed regions of the photosensitive layer a near infrared-absorbing dye (VII) according to the following reaction scheme:

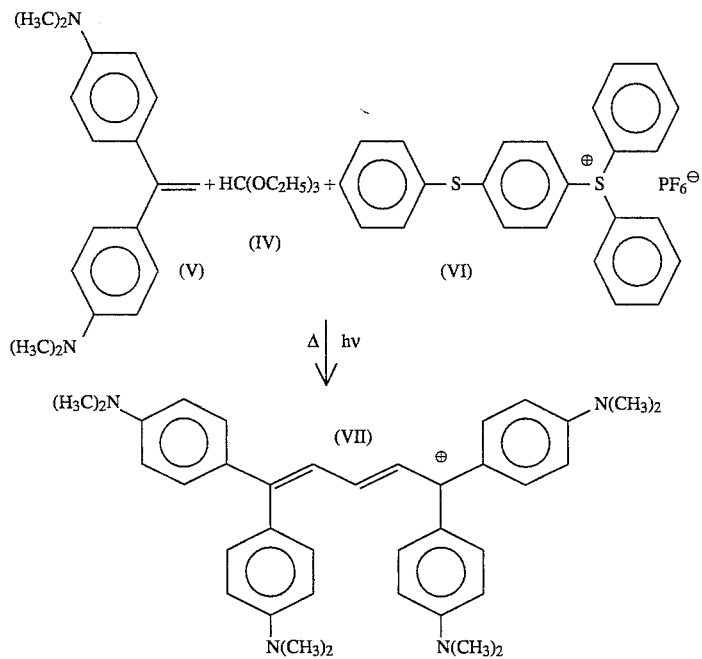

23. The method of claim 11 wherein the photosensitive layer comprises a radiation absorbing dye and a photolysable compound, wherein exposure of the photosensitive layer causes destruction of the dye in the exposed areas by decomposition products of the photolysable compound.

24. A magnetic recording disk comprising a support having coated on at least one major surface thereof a layer of a magnetic recording medium and a photosensitive layer, which may be separate from or integral with the magnetic recording layer, wherein exposure of the photosensitive layer to activating actinic radiation causes generation or destruction of a radiation absorbing dye or promotes or inhibits the generation or destruction of a radiation-absorbing dye upon heat development.

* * * * *

UNITED STATES PATENT AND TRADEMARK OFFICE
CERTIFICATE OF CORRECTION

PATENT NO. : 5,462,823
DATED : October 31, 1995
INVENTOR(S) : Christopher M. Evans, et al.

It is certified that error appears in the above-indentified patent and that said Letters Patent is hereby corrected as shown below:

Column 10, lines 38-39, delete "PCT/U.S. Pat. No. 90/02792" and insert --PCT/US90/02792--.

Column 13, line 64, delete "of kbytes" and insert --of 360 kbytes--.

Signed and Sealed this

Thirtieth Day of January, 1996

Attest:

BRUCE LEHMAN

*Attesting Officer*  *Commissioner of Patents and Trademarks*